United States Patent
De Wit et al.

(10) Patent No.: US 9,037,166 B2
(45) Date of Patent: May 19, 2015

(54) APPARATUS AND METHOD FOR SCHEDULING PAGING MESSAGES IN A COMMUNICATIONS NETWORK

(71) Applicant: Telefonaktiebolaget L M Ericsson (publ), Stockholm (SE)

(72) Inventors: Erik De Wit, Rimbo (SE); Bengt Persson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 13/808,672

(22) PCT Filed: Dec. 11, 2012

(86) PCT No.: PCT/SE2012/051375
§ 371 (c)(1),
(2) Date: Jan. 7, 2013

(87) PCT Pub. No.: WO2014/092614
PCT Pub. Date: Jun. 19, 2014

(65) Prior Publication Data
US 2014/0162705 A1    Jun. 12, 2014

(51) Int. Cl.
*H04W 68/00* (2009.01)
*H04W 68/02* (2009.01)
*H04W 4/20* (2009.01)
*H04W 4/12* (2009.01)
*H04W 4/16* (2009.01)

(52) U.S. Cl.
CPC .............. *H04W 68/02* (2013.01); *H04W 4/20* (2013.01); *H04W 4/12* (2013.01); *H04W 4/16* (2013.01)

(58) Field of Classification Search
CPC ... H04W 68/02; H04W 68/00; H04W 68/005; H04W 4/005; H04W 68/12; H04W 68/025
USPC .................. 455/458; 718/102, 103, 104, 105; 370/232, 230.1, 233, 234
See application file for complete search history.

(56) References Cited

U.S. PATENT DOCUMENTS

| | | | |
|---|---|---|---|
| 6,282,178 B1 * | 8/2001 | Noerpel et al. | 370/316 |
| 6,731,944 B1 | 5/2004 | Ostrup et al. | |
| 7,480,510 B1 | 1/2009 | Woleben et al. | |
| 7,941,175 B1 | 5/2011 | Hoff et al. | |
| 8,305,894 B1 * | 11/2012 | Zang et al. | 370/232 |

(Continued)

FOREIGN PATENT DOCUMENTS

WO    WO 2011083662 A1    7/2011

OTHER PUBLICATIONS

International Search Report, PCT Application No. PCT/SE2012/051375, mailed Dec. 19, 2013, 7 pages.

(Continued)

*Primary Examiner* — Khalid Shaheed
(74) *Attorney, Agent, or Firm* — Myers Bigel Sibley & Sajovec, P.A.

(57) ABSTRACT

A method of scheduling paging messages in a communications network comprises the steps of receiving new paging messages to be scheduled, scheduling the paging messages on a first come first served basis during a first mode of operation, scheduling the paging messages based on priority levels of the paging messages during a second mode of operation, and switching between the first mode of operation and the second mode of operation according to the volume of paging messages being scheduled.

17 Claims, 6 Drawing Sheets

(56) References Cited

U.S. PATENT DOCUMENTS

| | | | |
|---|---|---|---|
| 2007/0171850 A1* | 7/2007 | Feder et al. | 370/311 |
| 2010/0284387 A1* | 11/2010 | Zhao et al. | 370/338 |
| 2012/0315929 A1* | 12/2012 | Oshinsky et al. | 455/458 |
| 2013/0339438 A1* | 12/2013 | Cherian et al. | 709/204 |

OTHER PUBLICATIONS

Written Opinion of the International Searching Authority, PCT Application No. PCT/SE2012/051375, mailed Dec. 19, 2013, 7 pages.

* cited by examiner

| CN domain | Paging Cause | Priority internal distribution sequence | Priority scheduling PCH | |
|---|---|---|---|---|
| | | | First attempt | Repetition attempt |
| CS | Term. Conversational call | High | 1 | 20 |
| | Term. Streaming call | High | 1 | 20 |
| | Term. Interactive call | High | 1 | 20 |
| | Term. Background call | Low | 1 | 20 |
| | Term. High priority signaling | High | 1 | 20 |
| | Term. Low priority signaling | Low | 1 | 20 |
| | Cause unknown | Low | 1 | 20 |
| PS | Term. Conversational call | Low | 10 | 30 |
| | Term. Streaming call | Low | 10 | 30 |
| | Term. Interactive call | Low | 10 | 30 |
| | Term. Background call | Low | 10 | 30 |
| | Term. High priority signaling | Low | 10 | 30 |
| | Term. Low priority signaling | Low | 10 | 30 |
| | Cause unknown | Low | 10 | 30 |
| RNC Internal (URA, e-DCH) | Cause unknown | Medium | 5 | 15 |

Figure 5

| | CS1 | CS2 | PS1 | PS2 | INT1 | INT2 |
|---|---|---|---|---|---|---|
| CS1 | - | Yes | Yes | Yes | Yes | Yes |
| PS1 | No | Yes | - | Yes | No | Yes |
| INT1 | No | Yes | Yes | Yes | - | Yes |

Figure 6

| Priority found in priority table | Load control request type in AI 310/15518-AXD 10503 | Priority/Gate in request type towards Load Control |
|---|---|---|
| High | RlibLoadCtrlPagePrioHigh | F2 |
| Medium | RlibLoadCtrlPagePrioMedium | F3 |
| Low | RlibLoadCtrlPagePrioLow | F4 |

Figure 7

APPARATUS AND METHOD FOR SCHEDULING PAGING MESSAGES IN A COMMUNICATIONS NETWORK

CROSS REFERENCE TO RELATED APPLICATION

This application is a 35 U.S.C. §371 national stage application of PCT International Application No. PCT/SE2012/051375, filed on 11 Dec. 2012, the disclosure and content of which is incorporated by reference herein in its entirety.

TECHNICAL FIELD

The present invention relates to an apparatus and method for scheduling paging messages in a communications network.

BACKGROUND

Paging is a function which enables a core network to page a user equipment device for terminating service requests.

Paging a user equipment device which is in an IDLE mode or a UTRAN Registration-Area Paging Channel Mode (URA-PCH mode) is typically performed with a paging message known as a PAGING TYPE 1 message (as defined in the 3$^{rd}$ Generation Partnership Project, technical specification 3GPP TS 25.331), which is transferred on a logical channel known as the paging control channel (PCCH). A paging message such as a PAGING TYPE 1 message can carry a number of paging records addressing different user equipment devices.

There is a physical capacity limit for a paging channel (PCH) transport channel. As such, there is a limited number of paging messages that can be sent each second. If the limit is reached, new paging messages cannot be scheduled and must be discarded instead, or delayed as shown in U.S. Pat. No. 6,731,944.

Existing mechanisms for scheduling paging messages on a paging channel are based on the principle of trying to increase the probability of a paging message reaching the intended user equipment device, for example to increase the probability of a user equipment device receiving a paging message in the event of radio disturbance.

The existing solution in a wireless regional area network (WRAN) is to schedule each paging record multiple times on the paging channel. The reason for this is to increase the probability that the user equipment device will hear the page. If the first scheduled paging attempt is not received by the user equipment device, for example due to short disturbance in radio conditions, there is a good chance that the user equipment device will hear the repetition paging attempt without a problem.

However, this ever increasing trend in the amount of paging attempts that a WRAN shall handle, by scheduling paging attempts multiple times for a UE, causes even further capacity problems on the paging channel. As such, there is no capacity to schedule paging attempts for other user equipment devices.

This increase can be avoided by reducing the size of the paging area, but at the cost of an increased need to provide location updates, i.e. because a user moves between different paging areas more frequently.

Furthermore, a high inflow of Radio Access Network Application Part (RANAP) paging messages from a core network may trigger overload in the paging message flow within a radio network controller. RANAP paging messages are specified in 3GPP TS 25.413. The overload in the paging message flow in the radio network controller can be triggered either during the internal distribution phase of the paging message in a radio network controller, or while scheduling the paging message on the paging channel. In either case, paging messages are discarded unconditionally during overflow, and they are handled on a first come first served basis in the radio network controller.

SUMMARY

It is an aim of the present invention to provide a method and apparatus which obviate or reduce at least one or more of the disadvantages mentioned above.

According to a first aspect of the invention there is provided a method of handling paging messages in a communications network. The method comprises the steps of receiving new paging messages to be scheduled, and scheduling the paging messages on a first come first served basis during a first mode of operation, and scheduling the paging messages based on priority levels of the paging messages during a second mode of operation. The method switches between the first mode of operation and the second mode of operation according to the volume of paging messages being scheduled.

According to another aspect of the invention there is provided a network element for scheduling paging messages. The network element comprises a receiving unit for receiving new paging messages to be scheduled, and a processing unit adapted to process the paging messages on a first come first served basis during a first mode of operation, and adapted to process the paging messages based on priority levels of the paging messages during a second mode of operation. A control unit is adapted to cause the processing unit to switch between processing in the first mode of operation and the second mode of operation according to the volume of paging messages being scheduled.

BRIEF DESCRIPTION OF THE DRAWINGS

For a better understanding of the present invention, and to show more clearly how it may be carried into effect, reference will now be made, by way of example only, to the following drawings in which:

FIG. 5 shows an example of a priority table that may be used with embodiments of the invention;

FIG. 6 shows another example of a priority table that may be used with embodiments of the invention; and FIG. 7 shows another example of a priority table that may be used with embodiments of the invention.

DETAILED DESCRIPTION

Figure 1:
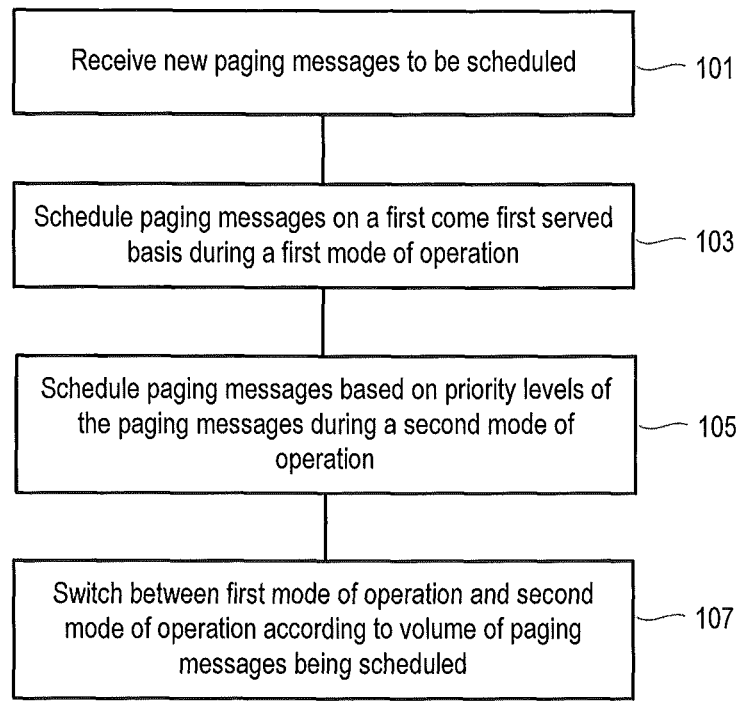
FIG. 1 shows a method according to an embodiment of the present invention.

FIG. 1 shows a method performed by an embodiment of the invention for scheduling paging messages in a communications network. The method comprises the step of receiving new paging messages to be scheduled, step 101. The paging messages are scheduled on a first come first served basis during a first mode of operation, step 103. The paging messages are scheduled based on priority levels of the paging messages during a second mode of operation, step 105. The method comprises the step of switching between the first mode of operation and the second mode of operation according to the volume of paging messages being scheduled.

By scheduling paging messages differently according to the volume of paging messages being handled, for example during times of congestion or overload, this means that higher priority paging messages (such as, for example, first-attempt paging messages, or paging messages relating to relatively more critical causes or service requests) can take priority over lower priority paging messages (for example repetition-attempt paging messages, or paging messages relating to less critical causes or service requests), as will be discussed in greater detail below. Thus, if the usage level of a paging channel, for example, is higher than a threshold level and there is a consequential problem to schedule paging records, the method will no longer use the principle to increase the probability to reach a particular user equipment device in case of radio disturbance, (i.e. no longer operate in the first mode of operation whereby first-attempts and subsequent repetition-attempts are treated equally on a first come first served basis). Instead the principle will be to send as many paging messages to different user equipment devices as possible, thereby operating in the second mode of operation whereby first-attempts can be treated as higher priority than repetition-attempts, for example.

The trigger for the switching operation between the first mode of operation and the second mode of operation, i.e. based on the volume of paging messages being handled or scheduled, can be determined in a number of ways, either individually or in combination. These include the switching between the first mode of operation and the second mode of operation being based on a traffic level of a paging channel used to transport the paging messages, for example by comparing the traffic level of a paging channel with a threshold value. For example, a certain parameter value may be compared with a threshold value for that parameter, and switching between the first and second modes carried out as the parameter value moves above or below the threshold value. Hysteresis may also be provided in relation to the threshold value, for example to avoid the system switching too frequently if the traffic level deviates about the threshold value. In such an embodiment a mechanism may be provided for monitoring the traffic level on a paging channel, with the feedback from this monitoring mechanism being used to trigger the switching between modes. The mechanism for monitoring the traffic level on the paging channel may be a mechanism provided specifically for this purpose, or a mechanism already provided by some other part of the network, or some node of the network. It is noted that the traffic level on the paging channel may also be determined directly, or indirectly whereby some other signal or data is used to infer or estimate a traffic level of a paging channel.

The switching between the first mode of operation and the second mode of operation may also be based on an occupancy of a scheduling queue used to schedule paging messages. In other words, the trigger for the switching between a first come first served basis of the first mode of operation to a priority handling basis of the second mode of operation can be triggered depending on the occupancy of a scheduling queue. The scheduling queue is a queue where paging messages are stored as paging records while they are awaiting to be sent.

The switching between the first mode of operation and the second mode of operation may also be based on the inflow of paging messages into a network node which handles the paging messages, for example a radio network controller. In such an embodiment the trigger for switching between the modes is therefore effected by monitoring the inflow of paging messages into the node, such that the mode of operation can be changed from the first mode of operation having a simple first come first served basis to a second mode of operation with a more complex priority mechanism depending on the volume of paging messages being handled or scheduled.

As mentioned above, any one of these examples of trigger mechanisms for switching between operating modes can be used, either alone or in combination. The decision to switch between the first and second modes of operation may be carried out on a per Radio Access Network Application Part (RANAP) paging message basis, for example, and, if desired, may be configured to be valid for only one paging message.

Figure 2:
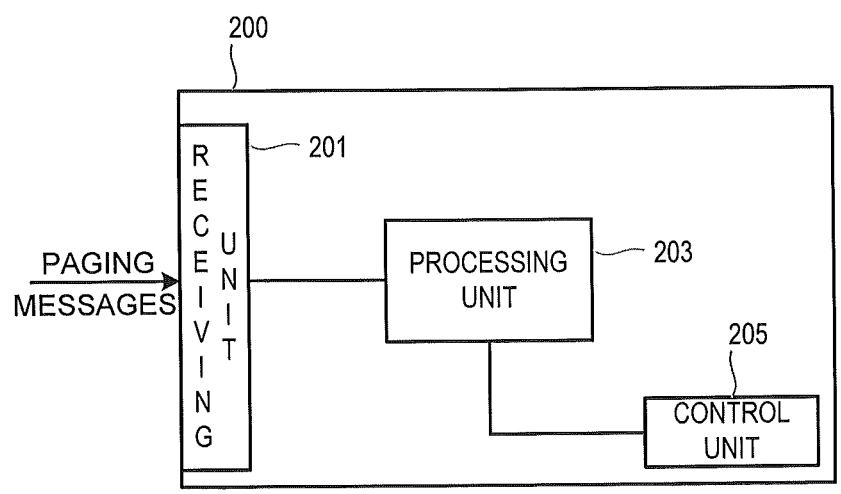
FIG. 2 shows an apparatus according to an embodiment of the present invention.

FIG. 2 shows a network element 200 for handling paging messages according to another embodiment of the invention. The network element 200 may form part of a radio network controller, for example, or another node other than a radio network controller which handles paging messages, for example a eNodeB. The network element 200 comprises a receiving unit 201 for receiving new paging messages to be scheduled. A processing unit 203 is adapted to process the paging messages on a first come first served basis during a first mode of operation, and adapted to process the paging messages based on priority levels of the paging messages during a second mode of operation. A control unit 205 is adapted to cause the processing unit 203 to switch between processing in the first mode of operation and the second mode of operation according to the volume of paging messages being scheduled.

As mentioned above, the control unit 205 can be adapted to cause switching between the first mode of operation and the second mode of operation based on one or more of: a traffic level of a paging channel used to transport the paging messages; an occupancy of a scheduling queue used to schedule paging messages; or the inflow of paging messages in a radio network controller.

When the receiving unit 201 receives a request to schedule a new paging message, the processing unit 203 can be adapted to compare the priority level of the new paging message with the priority level of paging messages already stored in a scheduling queue and, in the event that one or more paging messages with a lower priority level are found to be stored in the scheduling queue, replace one or more of the lower priority level paging messages with the new paging message.

Figure 3:
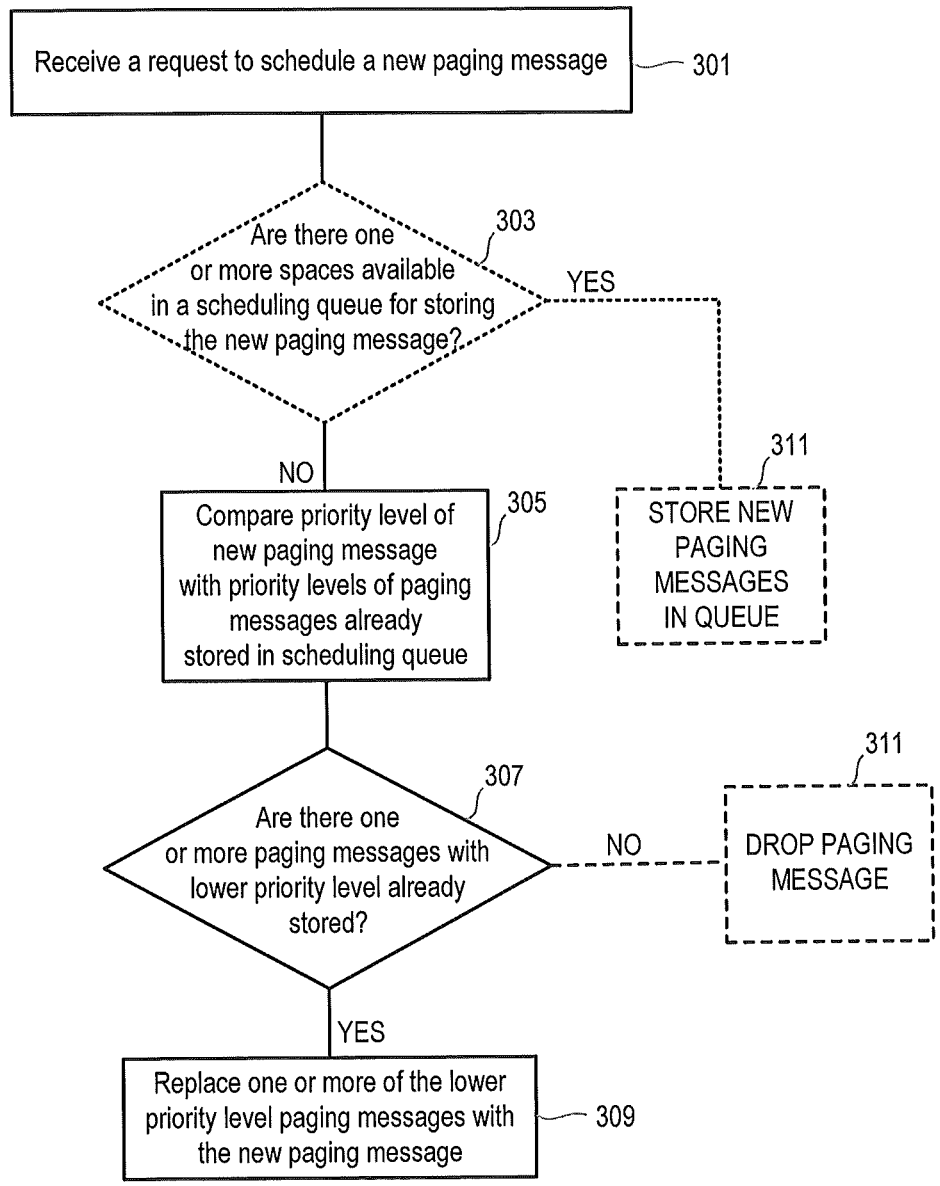
FIG. 3 shows a method according to another embodiment of the invention.

FIG. 3 shows further details about the steps performed by an embodiment of the invention in this respect, and how the operation can switch between the first and second modes of operation. In particular, the embodiment of FIG. 3 relates to how paging messages are processed when an overload occurs while scheduling paging messages on the paging channel. In step 301 a request to schedule a new paging message is received. It is determined in step 303 if there are one or more spaces available in a scheduling queue for storing the new paging message. For example, if the new paging message requires just one space, it is determined whether the scheduling queue has one free space to accommodate the new paging message request. If a new paging message requires N spaces, it is determined whether the scheduling queue has N free spaces to accommodate the new paging message request. If it is determined in step 303 that such free space or spaces exist, then the new paging message is stored in the scheduling queue as a paging record, awaiting to be transmitted.

It is noted that each queue position in the scheduling queue corresponds to a paging occasion, with each queue position containing a number of spaces as described above, each space containing a paging record.

If it is determined in step 303 that there are insufficient spaces in the scheduling queue (for example in a particular paging occasion) for storing the new paging message request, then processing moves to step 305, where the priority level of the new paging message is compared with the priority level of paging messages already stored in the scheduling queue (for example, for that that particular paging occasion). In the event that one or more paging messages with a lower priority level than the new paging message are found to be stored in the scheduling queue, as determined in step 307, then one or more of the lower priority level paging messages are replaced with the new paging message, step 309. For example, if the new paging message requires just one space in the queue, then one lower priority paging message already stored is replaced with the new paging message. If the new paging message requires N spaces in the queue, then N lower priority paging messages already stored are replaced with the new paging message. The paging record that is replaced may still be sent as it may exist in another scheduling occasion. It is noted that a previously stored paging message may itself comprise M spaces in the scheduling queue, in which case replacing a previously stored paging message may free up M spaces.

If it is determined in step 307 that there are an insufficient number of lower priority paging messages already stored in the queue (as paging records), then the new paging message is dropped, step 311. It is noted that, prior to dropping a paging message, other paging occasions of the scheduling queue can be checked first to determine whether such paging occasions have space for the new paging message. In addition it is noted that, if desired, such other paging occasions can be checked before performing the steps of comparing priority levels and replacing lower priority level paging messages (as will be explained in greater detail below in the embodiment of FIG. 4).

In the embodiment above it can be seen that the steps of comparing priority levels and replacing one or more lower priority level paging messages are performed after first determining that there are insufficient spaces available in the scheduling queue for storing a new paging message.

However, it is noted that step 303 (shown in dotted lines) is optional, and instead, according to another embodiment of the invention, an overload condition or a trigger to switch modes can be received from elsewhere. In such cases the method can be adapted to compare the priority level of a new paging message with priority levels of paging messages already stored in a scheduling queue each time a new paging message is received, and to replace lower priority paging messages even when the scheduling queue is not necessarily full (but where some other indication of overload, or expected overload, or volume being above a certain threshold level is used to trigger this mode of operation). In such an example the method can be adapted to reduce the use of repetition attempts in order to increase the total number of separate user equipment devices that can be paged, even before the scheduling queue becomes full.

According to one embodiment, the step of comparing priority levels further comprises the steps of determining if any of the paging messages having a lower priority level are repetition-attempts of a paging message, and if so replacing a repetition-attempt with the new paging message (such as a first-attempt paging message).

Replacing repetition-attempt type paging messages with first-attempt type paging messages has the advantage of enabling more user equipment devices to be paged when there is a high volume of paging messages being scheduled or handled, for example during busy periods, since more capacity will be made available for first-attempts. In a similar way third-attempt paging messages may be replaced with first attempt or second-attempt paging messages.

The method may comprise the step of preventing a paging message that has replaced a previously scheduled paging message from being scheduled further itself, i.e. as a repetition-attempt paging message. This has the advantage that, if a particular user equipment device is fortunate enough to be able to use the priority mechanism to have its paging message replace a previously scheduled paging message of another user equipment device (for example by having its first-attempt paging message replace a second-attempt paging message of another user equipment device), then such a user equipment device cannot then have a repetition-attempt itself for that particular paging message.

From the embodiment above it can be seen that depending on the usage level of a paging channel there may be overload while scheduling the paging message on the paging channel. If overload occurs, the mechanism may change the scheduling principle. Instead the principle will now be to send as many paging messages to different user equipment devices as possible.

Instead of rejecting a paging message if overload occurs while scheduling the paging record on the paging channel, the paging priority mechanism will check if any of the paging records that are already scheduled in the same scheduling occasion as for this user equipment device have a lower priority than the new paging record to be scheduled. If so, a paging record with lower priority will be replaced by a paging record with higher priority. The paging record that is replaced may still be sent as it may exist in another scheduling occasion.

Figure 4A:
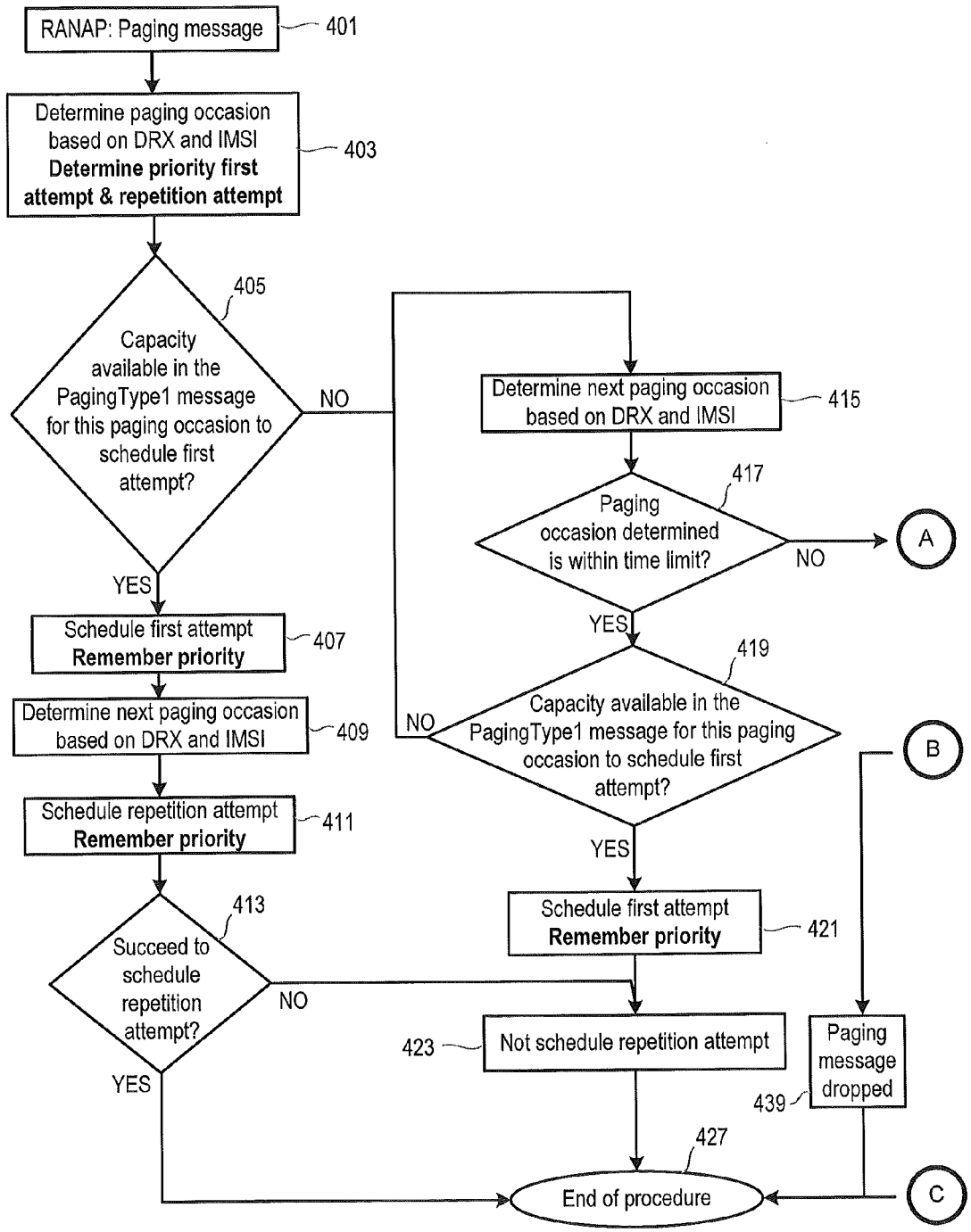
FIG. 4 shows a method according to another embodiment of the invention.
Figure 4B:
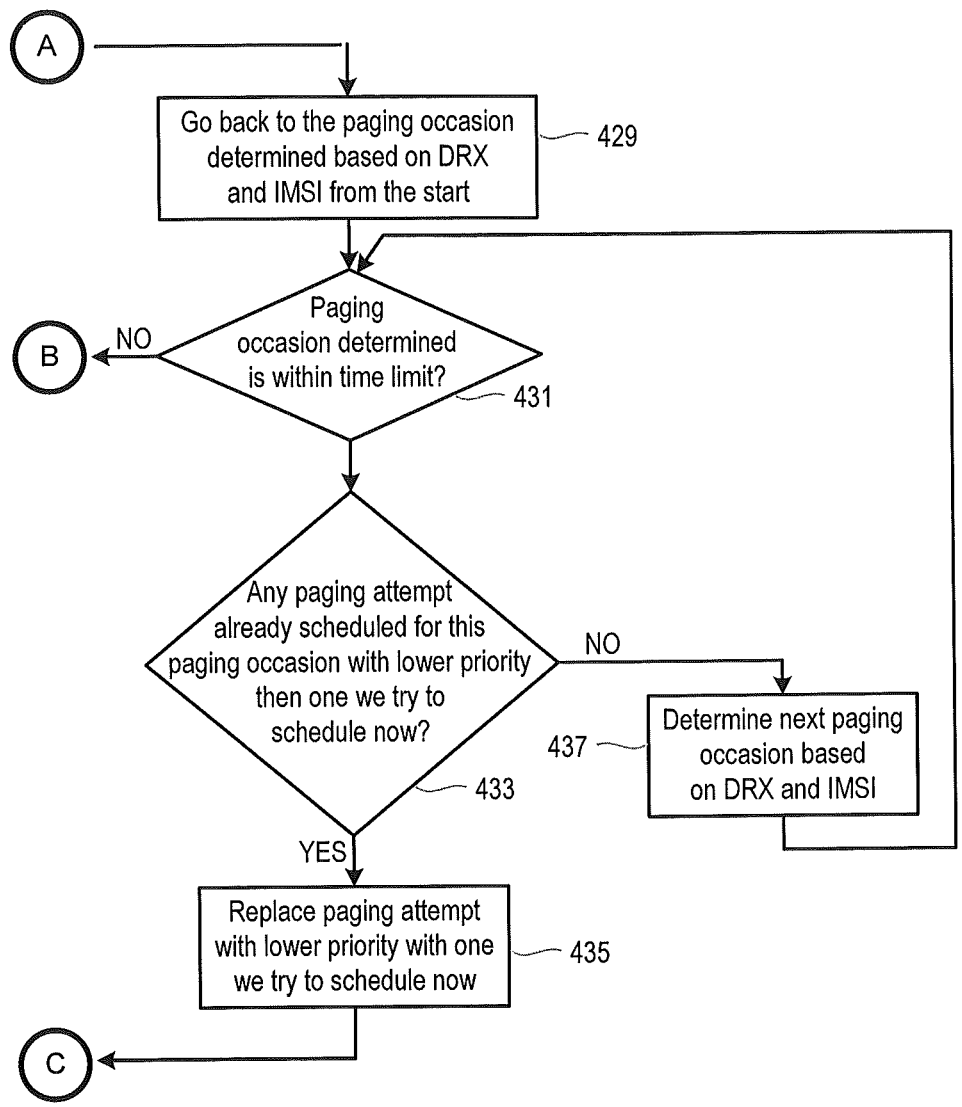

FIG. 4 (comprising FIGS. 4a and 4b) shows further details about how paging messages may be scheduled according to an embodiment of the invention. In the example of FIG. 4 the priority levels of a paging message will be described in the context of being first-attempt or repetition-attempt paging messages. However, it is noted that different priority levels or criteria may be applied, other than first-attempt or repetition-attempt, such as those mentioned later in the application with respect to FIGS. 5 to 7.

In step 401 a paging message such as a RANAP paging message is received. A paging occasion specifies times when a user equipment device has to monitor its paging indicator. In step 403 the paging occasion is determined based on a Discontinuous Reception (DRX) cycle length coefficient and an International Mobile Subscriber Identity (IMSI) of the user equipment being paged. The DRX Cycle Length is ($2^k$*SFN), where k is an integer, known as the DRX Cycle Length coefficient, and SFN the System Frame Number. One SFN is typically 10 ms. The value of k can be set by an operator, and can be a different value for circuit switched (CS) and packet switched (PS) domains. For example, a specific value exists for k when paging user equipment devices in Connected Mode and in a URA_PCH state (i.e. connected but not having any dedicated channels assigned to them).

In addition, in step 403 the priority level of the paging message is determined, for example determining whether the paging message is a first-attempt or a repetition-attempt. In step 405 it is determined if there is capacity available in a PagingType1 message for this paging occasion to schedule a first-attempt paging message? If so, the first-attempt paging message is scheduled, and the priority remembered, step 407. In step 409 the next paging occasion is determined, again based on DRX and IMSI as described above. A repetition-attempt for the paging message is scheduled in step 411, which includes remembering the priority of that repetition-attempt. If it is determined in step 413 that the scheduling of the repetition-attempt has been successful, then the procedure ends, step 427. If it is determined in step 413 that the repetition-attempt has not been successful, then the repetition attempt is not scheduled, step 423, and the procedure ends.

If it is determined in step 405 that there is no capacity available for scheduling a first-attempt in that particular paging occasion, then the next paging occasion is determined in step 415, for example based on the DRX and IMSI as described above. In step 417 it is determined whether the next paging occasion is within an acceptable time limit. If so, it is determined in step 419 whether the next paging occasion has capacity available to schedule the first-attempt in the Paging-Type1 message of that paging occasion. If not, steps 415, 417 and 419 are repeated for subsequent paging occasions that are within the required time limit. If it is determined in step 419 that there is capacity for scheduling the first-attempt, then the first-attempt is scheduled in step 421, and the priority remembered.

If it is determined in step 417 that there are no subsequent paging occasions within an acceptable time limit, then in step 429 processing reverts to use of the initial paging occasion determined in step 403 using the DRX and IMSI. In step 431 it is determined whether the paging occasion is within the time limit. If not, then the paging message is dropped, step 439. It is noted that the step 431 is not necessarily needed on the first pass from step 429, and in certain embodiments step 431 is only performed on subsequent loops around steps 433 and 437, i.e. for subsequent paging occasions.

From the above it can be seen that this embodiment of the invention first tries to check if a different paging occasion can be used to schedule the paging message, before deciding to replace previously stored paging messages with lower priority paging messages. It is noted that these steps may be omitted if desired, such that a lower priority paging message is replaced without checking other paging occasions first.

If it is determined in step 431 that the paging occasion is within an acceptable time limit, then in step 433 it is determined whether any paging attempt already scheduled for this paging occasion has a lower priority compared to the priority of the paging message currently being scheduled. If so, then the lower priority paging message (already scheduled) is replaced with the paging message currently being scheduled, step 435. This has the advantage of enabling more user devices to be paged during a second mode of operation, for example when scheduling is busy, and spaces not available for new paging requests.

If it is determined in step 433 that there are no paging messages with lower priority already scheduled in that particular paging occasion, then in step 437 the next paging occasion is determined, for example based on DRX and IMSI as described earlier, and steps 431 and 433 repeated to determine if there are any paging messages with lower priority already scheduled in the next paging occasion. If so, a paging message with lower priority is replaced with the new paging message having a higher priority.

It is noted that the time limit used for subsequent paging occasions is set according to how often the core network will itself repeat a paging request. The time limit can therefore be set to avoid using a paging occasion that is too far ahead in time, otherwise the paging occasion would occur after scheduling a paging repeated from the core network.

In the embodiments above the priority levels have been described in relation to first-attempts and subsequent-attempts. It is noted however, that the embodiments of the invention are intended to embrace other forms of priority criteria being used to judge whether one particular paging message should replace another, when operating in the second mode of operation.

FIG. 5 shows an example of a priority table that can be used to prioritize one paging message against the other. In FIG. 5 it can be seen how different priority levels are assigned according to the type of core network domain, the paging cause, internal distribution sequence, or scheduling according to first-attempt or repetition-attempt.

The paging messages can therefore be classified into different types, and a priority level from a set of different priority levels assigned to each paging message type. A paging message type can therefore comprise one or more of:
- a first-attempt paging message type;
- a repetition-attempt paging message type;
- a paging message type relating to a paging cause;
- a priority level assigned to an internal distribution sequence of a paging handling process; or
- a circuit switched core network domain or a packet switched core network domain.

The priority level assigned to each paging message type is stored in a paging message priority table as shown in FIG. 5, wherein the paging message priority table is accessed during the handling of a new paging message.

In such an embodiment the method may comprise the steps of receiving a new paging message, determining the priority level assigned to the new paging massage, mapping the determined priority level with a request type for a load control function of a paging message handling process, making a request to the load control function based on the request type from the mapping step, and processing the paging message if the request to the load control function is granted, and discarding the paging message if the request to the load control function is not granted.

This has the advantage of being able to improve the internal distribution sequence during a high inflow of paging messages.

A priority mechanism based on a table such as that shown in FIG. 5 provides a mechanism to prioritize paging messages based on core network (CN) domain type (for example circuit switched, CS, or packet switched, PS), and the type of paging cause (for example, conversational call, streaming call, interactive call, background call, high priority signaling, low priority signaling, etc.). It is noted that other criteria may be used to compare priority levels. In the case of an overload in the paging message flow in a radio network controller node, or an indication that message flow is above a predetermined threshold, paging messages with higher priority will be given advantage over paging messages with lower priority. The mechanism is applicable, for example, when paging user equipment devices that are in an IDLE state or URA-PCH state.

If the overload situation in the paging message flow arises during the internal distribution sequence of the paging message in a radio network controller, paging messages with higher priority will be processed, while paging messages with lower priority may be discarded.

If there is overload while scheduling a paging message on the paging channel, a paging message with higher priority may replace an already scheduled paging message with lower priority. This does not necessarily imply that the paging message with the lower priority is lost. A paging message may have been scheduled more than once, depending on an operator parameter. The priority mechanism can be configured to replace a paging message with a lower priority paging message for one scheduling occasion only. It is possible that other scheduling occasions may not be effected and the paging message with lower priority will then be sent on the paging channel during such subsequent scheduling occasions.

The priority mechanism allows an operator to set the priority for a paging message based the parameters that are configured in the priority table of FIG. 5, such as the CN domain and paging cause, for example.

According to one embodiment, the priority mechanism can be configured to be selectively enabled or disabled on a per cell basis. With such an arrangement this enables the priority mechanism to be provided as an enhanced feature that can be under the license control of a network operator or radio network controller. With this feature if the license is activated the priority mechanism is switched-on for all cells in the radio network controller. New parameters or control functions may be introduced for this purpose, such as a control function for activating a paging priority for overload control, or deactivating a paging priority for overload control. Such parameters or control functions can be used to describe system behavior, and provided as a mechanism for enabling the priority mechanism to be selectively enabled or disabled on a per cell basis.

It may also be possible to switch-off and resume the priority mechanism on a per cell basis. New parameters or control functions may also be introduced for this purpose, such as a control function to stop paging priority handling for a cell, or to resume paging priority handling for a cell. This option is applicable to the priority mechanism when it is triggered during overload while scheduling a paging message on the paging channel.

The priority table shown in FIG. 5 can exists on a radio network controller level, for example, and can be maintained by the operator. Initially the priority table may have default values assigned to each combination of CN domain and paging cause. The default values or parameters in the priority table may be changed by an operator, for example based on performance statistics data. The values or parameters may be changed dynamically during use. Changes to these parameters or values can have an immediate impact on the paging success rate, which provides the advantage of being able to quickly improve system performance.

New parameters or control functions can be introduced to allow an operator to manipulate the settings in the priority table. For example, the new control functions can be provided to modify paging priority handling parameters and to list paging priority handling parameters.

In one embodiment three different priorities will exist, for example, for the same paging message, these being:
Priority internal distribution sequence
Priority scheduling on paging channel, first attempt
Priority scheduling on paging channel, repetition attempt The "Priority internal distribution sequence" is used by the priority mechanism when it is triggered due to an overload condition during the internal distribution sequence of the paging message in a radio network controller. In the example of FIG. 5 the priority levels are set as either High, Medium or Low. It is noted, however, that any number of priority levels may be assigned to this field, or any other of the fields in the priority table of FIG. 5.

The "Priority scheduling PCH" is used by the priority mechanism to schedule the paging message on the paging channel when there is overload. In the example it consists of two parts. One priority for the first scheduling attempt and another priority for the repetition scheduling attempts. It is noted that this may comprise further parts, such as different filed being provided for $1^{st}$ repetition attempts, $2^{nd}$ repetition attempts, $3^{rd}$ repetition attempts, etc.

The priorities can be provided with different weighted values, for example in the range 1 to 30.

As mentioned above, the values set in the priority table of FIG. 5 may be set by an operator. In addition, the default priority order may be set by an operator such that the priority mechanism handles paging messages in a particular way. In the table shown in the example of FIG. 6 the priority order is set as follows:
  allows a first CS page to replace a following CS page
  allows a first CS page to replace a first and repetition PS page
  allows a first CS page to replace a first and repetition RNC internal page
  does not allow a first PS page to replace a first CS page
  does not allow a first PS page to replace a first RNC internal page
  allows a first PS page to replace a repetition CS page
  allows a first PS page to replace a repetition PS page
  allows a first PS page to replace a repetition RNC internal page The data in FIG. 6 visualizes the data set in the priority table of FIG. 5, and corresponds to the settings that may be used to provide the priority list shown above.

The priority of a paging message is preferably determined as early as possible in the paging message flow by a radio network controller. The priority assigned to the paging message will be available throughout the paging message flow in radio network controller as long as needed, for example until the paging message is finally transferred to MAC in Layer 2.

As mentioned above, overload in the paging message flow can also occur during the internal distribution sequence of the paging message in a radio network controller, or while scheduling the paging message on the paging channel. New parameters or control functions can be updated for this behaviour, such as a control function to page UE(s) on a CN initiated basis, or page UE(s) on a RAN initiated basis. It is noted that the parameters or control functions described herein are implementation details specific to a particular operator, for example, and that other systems may be used by different operators to configure and control the priority mechanism.

The feature of providing a priority mechanism during an internal distribution sequence enables more efficient use of the Load Control function to be achieved on RANAP/C2 and the MC's to reject a RANAP paging message in the case of high inflow. In this way a load control function can be used to request permission to process a RANAP paging message.

If the feature is activated and a RANAP Paging message is received, a request to Load Control function is made. This request shall contain a request type. A mapping is made from the priority determined in the priority table to the request type used towards Load Control function, as shown in FIG. 7. FIG. 7 therefore shows an example of an implementation detail for a particular operator, whereby the priority determined for a RANAP paging message from the priority table is mapped to the gate to be used towards the Load control function. It is noted that different implementations may be used by different operators or applications, without departing from the scope of the invention.

This mapping enables the seven existing Load Control Request types, for example, related to 'Page request unconnected call' on Module MP and Central MP in AI, 310/15518-AXD10503, to be replaced by three Load Control Request types on Module MP and Central MP, as shown in FIG. 7.

The load managing of paging messages is important for network stability. If the load of a network with the embodiments of the invention is too high this load can be reduced through reduction of the paging messages being sent. The legacy solution is to drop some paging messages based on load, often in a random way. With the embodiments of the invention it is possible for an operator to control which pages should receive priority by, for example, giving high priority to initial page requests and medium priority for retries for page cause with high priority. And low priority for remaining page causes, thereby blocking page channel slots from low priority pages with high priory page retries.

Further details will now be provided in connection with overloads while scheduling the paging message on the paging channel.

In typical legacy implementations, paging messages are placed in a System Frame number (SFN, for example as defined in 3GPP TS 25.402) queue per cell (the SFN being 10 ms long, for example). The location in SFN queue is dependent on a Paging Indicator (calculation based on IMSI). Each queue position can contain a predetermined number of paging messages, for example a maximum of 5 paging messages (depending on the UE identity used, for example as determined from the IMSI).

If a SFN queue position is found, a priority will be saved along with the paging message. The "Priority scheduling PCH, first attempt" priority will be saved along with the paging message when it is initially stored in the SFN queue. The "Priority scheduling PCH, repetition attempt" priority is saved along with the paging message each time the paging message is repeated in the SFN queue. The number of times a paging message is repeated in the SFN queue is dependent on a parameter set by an operator, for example.

If a SFN queue position is already occupied, an attempt is made to place the paging message in the next available queue position matching the UE's Paging Indicator. If a SFN queue position is found, a priority will be saved along with the paging message. The "Priority scheduling PCH, first attempt" priority will be saved along with the paging message when it is initially stored in the SFN queue. The "Priority scheduling PCH, repetition attempt" priority is saved along with the paging message each time the paging message is repeated in the SFN queue.

Instead of dropping the paging message when no SFN queue position is found, this feature will compare the priority of the paging message to be scheduled, against the priority of the paging messages already scheduled in this queue position. If a paging message with lower priority is found, it will be replaced with the new paging message. If no paging message with lower priority is found an attempt is made to replace the paging message at the next available SFN queue position(s) for this UE. If it is still not possible to replace after a number of re-attempts then the paging message will have to be dropped (and existing performance statistics counters, if used, being stepped to reflect that a paging message has been dropped).

It may be required to find more than one paging message with lower priority depending on the UE identity used in the paging message to be scheduled. The length of the paging message is depending on the UE identity used.

Since the method for dropping paging requests is different to prior art solutions, different operators using embodiments of the invention may need to adapt their systems to provide network observability. For example, new performance statistics counters can be provided showing if the priority mechanism replaces a paging message which was already scheduled in the queue. A new performance statistics counter may therefore be introduced. It is incremented when the priority mechanism successfully replaces a paging message which was already scheduled in the queue. Also, if existing counters are provided for monitoring this event, such counters will be incremented.

A paging message that replaces a paging message with lower priority will only be scheduled once in the SFN queue.

In a typical embodiment a change of priority in the priority table will not affect an already scheduled paging message in the SFN queue, but this is a possibility.

According to another aspect of the invention, there is provided a method of paging a communication network. The method comprises the steps of: scheduling paging records and one or more associated repetition paging records for each UE during a first mode of operation; scheduling paging records for each UE, and disabling any repetition paging records being used for at least one UE during a second mode of operation; and switching between the first mode of operation and the second mode of operation according to the usage of the paging channel.

According to another aspect of the invention, there is provided a method of paging in a communication network. The method comprises the steps of: scheduling paging records and one or more associated repetition paging records for a UE on an equal priority basis during a first mode of operation; scheduling paging records and one or more associated repetition paging records for a UE on a different priority basis during a second mode of operation; and switching between the first mode of operation and the second mode of operation according to the usage of the paging channel.

According to another aspect of the invention, there is provided a method of scheduling a paging record for a user equipment device into a paging message. The method comprises the steps of: determining whether there is capacity in the paging message for scheduling the paging record; and, if not determining whether the paging record to be scheduled into the paging message is a high priority paging record (first attempt) or a low priority paging record (repetition paging record); determining whether any paging record already scheduled into the paging message has a lower priority than the current paging records; and, if so replacing the already schedule lower priority paging records with the higher priority paging record. This embodiment deals with priority messages on a message by message basis, depending upon whether a paging message can be scheduled into a scheduling occasion, and does not necessarily receive some other form of signal from the paging channel which provides an indication of the usage level of the paging channel. In this way the usage level is determined implicitly from the fill level of the scheduling queue.

The embodiments of the invention described above therefore provide a paging priority mechanism that can schedule paging records on a paging channel depending on the usage level of the paging channel. If the usage level of the paging channel is low and there is no problem to schedule paging records, then they can be scheduled normally on a first come first served basis, and whereby repetition paging records are scheduled using existing mechanisms. However, when usage level becomes high, lower priority paging records (such as repetition-attempts) can be used less or omitted, in place of higher priority paging records such as first-attempt paging records.

The paging priority mechanism can initially schedule paging records on the paging channel based on the principle to increase the probability to reach the user equipment devices in case of radio disturbance, and then when traffic becomes too high, switch to increasing the number of user equipment devices that can be reached.

The embodiments of the invention have the advantage of providing less load in the network due to increased paging success rate, and of having less need for a core network to repeat RANAP paging messages.

The embodiments of the invention also have the advantage of being able to automatically change the principles used for scheduling paging messages on a paging channel depending on usage level of the paging channel. This enables a more optimal usage of the limited paging channel capacity.

It is noted that the switching between first mode of operation and the second mode of operation can be enabled or disabled on a cell by cell basis in the communications network, or on a cluster by cluster of cells, or for the entire network.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of scheduling paging messages in a communications network, the method comprising:
   receiving new paging messages to be scheduled;
   scheduling the new paging messages on a first come first served basis during a first mode of operation;
   scheduling the new paging messages based on priority levels of the paging messages during a second mode of operation; and
   switching between the first mode of operation and the second mode of operation according to the volume of paging messages being scheduled,
   wherein the scheduling the new paging messages based on priority levels comprises:
   receiving one new paging message of the new paging messages;
   determining the priority level assigned to the one new paging message;
   mapping the determined priority level with a request type for a load control function of a paging message handling process;
   making a request to the load control function based on the request type from the mapping; and
   processing the one new paging message if the request to the load control function is granted, and discarding the one new paging message if the request to the load control function is not granted.

2. A method as claimed in claim 1, wherein the switching between the first mode of operation and the second mode of operation is based on a traffic level of a paging channel used to transport the paging messages, or a traffic level of a paging channel in comparison to a threshold value.

3. A method as claimed in claim 1, wherein the switching between the first mode of operation and the second mode of operation is based on an occupancy of a scheduling queue used to schedule paging messages.

4. A method as claimed in claim 1, wherein switching between the first mode of operation and the second mode of operation is based on the inflow of paging messages in a radio network controller.

5. A method of scheduling paging messages in a communications network, the method performed by a network element, the method comprising:
   receiving, at the network element, a request to schedule a new paging message;
   comparing, by the network element, a priority level of the new paging message with a priority level of paging messages already stored in a scheduling queue; and
   in the event that one or more paging messages with a lower priority level are found to be stored in the scheduling queue, replacing, by the network element, one or more of the lower priority level paging messages with the new paging message,
   wherein the comparing and the replacing are performed only after first determining that there are insufficient spaces available in the scheduling queue for storing the new paging message.

6. A method of scheduling paging messages in a communications network, the method performed by a network element, the method comprising:
   receiving, at the network element, a request to schedule a new paging message;
   comparing, by the network element, a priority level of the new paging message with a priority level of paging messages already stored in a scheduling queue; and
   in the event that one or more paging messages with a lower priority level are found to be stored in the scheduling queue, replacing, by the network element, one or more of the lower priority level paging messages with the new paging message,
   wherein the comparing further comprises determining if any of the paging messages having a lower priority level are repetition-attempts of a paging message, and if so replacing a repetition-attempt with the new paging message.

7. A method as claimed in claim 6, further comprising:
   preventing a paging message that has replaced a previously scheduled paging message from being scheduled further as a repetition-attempt paging message.

8. A method as claimed in claim 1, wherein a paging message type comprises one or more of:
   a first-attempt paging message type;
   a repetition-attempt paging message type;
   a paging message type relating to a paging cause;
   a priority level assigned to an internal distribution sequence of a paging handling process; or
   a circuit switched core network domain or a packet switched core network domain.

9. A method as claimed in claim 8, wherein the priority level assigned to each paging message type is stored in a paging message priority table, the paging message priority table being accessed during the scheduling of a new paging message.

10. A method as claimed in claim 1, wherein the switching between the first mode of operation and the second mode of operation is enabled or disabled on a cell by cell basis in the communications network.

11. A network element for scheduling paging messages, the network element comprising:
    a receiving unit adapted to receiving new paging messages to be scheduled;
    a processing unit adapted to process the new paging messages on a first come first served basis during a first mode of operation, and adapted to process the new paging messages based on priority levels of the new paging messages during a second mode of operation; and
    a control unit adapted to cause the processing unit to switch between processing in the first mode of operation and the second mode of operation according to a volume of the new paging messages being scheduled, wherein the processing unit is further adapted to:
- receive one new paging message of the new paging messages;
- determine a priority level of the priority levels assigned to the one new paging message;
- map the determined priority level with a request type for a load control function of a paging message handling process;
- make a request to the load control function based on the request type from the mapping; and
- process the one new paging message if the request to the load control function is granted, and discard the one new paging message if the request to the load control function is not granted.

12. A network element as claimed in claim 11, wherein the control unit is adapted to cause switching between the first mode of operation and the second mode of operation based on one or more of:
- a traffic level of a paging channel used to transport the paging messages;
- a traffic level of a paging channel in comparison to a threshold value;
- an occupancy of a scheduling queue used to schedule paging messages; or
- the inflow of paging messages in a radio network controller.

13. A network element for scheduling paging messages, the network element comprising:
- a receiving unit adapted to receive a request to schedule a new paging message, and
- a processing unit adapted to:
  - compare a priority level of the new paging message with a priority level of paging messages already stored in a scheduling queue; and
  - in the event that one or more paging messages with a lower priority level are found to be stored in the scheduling queue, replace one or more of the lower priority level paging messages with the new paging message,
  - wherein the compare and the replace are performed only after first determining that there are insufficient spaces available in the scheduling queue for storing the new paging message.

14. A network element as claimed in claim 11, further comprising a paging message priority table containing the priority level assigned to each paging message type, wherein the processing unit accesses the paging message priority table to determine the priority levels of the paging messages.

15. A network element as claimed in claim 11, wherein the control unit is adapted to control, on a cell by cell basis in the communications network, enabling or disabling the processing unit to perform the switching between the first mode of operation and the second mode of operation.

16. A method as claimed in claim 1,
wherein paging messages are classified into different types, and a priority level from a set of different priority levels is assigned to each paging message type.

17. A network element as claimed in claim 11,
wherein paging messages are classified into different types, and a priority level from a set of different priority levels is assigned to each paging message type.

\* \* \* \* \*